UNITED STATES PATENT OFFICE.

LUDWIG RISSMULLER, OF NEW YORK, N. Y.

PROCESS OF MAKING FERTILIZERS FROM REFUSE LIQUIDS.

SPECIFICATION forming part of Letters Patent No. 646,559, dated April 3, 1900.

Application filed September 29, 1899. Serial No. 732,037. (No specimens.)

*To all whom it may concern:*

Be it known that I, LUDWIG RISSMULLER, a citizen of Germany, and a resident of New York city, in the county and State of New York, have invented a new and Improved Process of Extracting Nitrogenous Substances from Factory Refuse Liquids and Liquids of Similar Character, of which the following is a specification.

Certain factory refuse liquids are more or less rich in nitrogenous materials which are when secured useful as fertilizers and otherwise. Evaporation of the water of such refuse liquids has been employed to some extent as a means of securing nitrogenous substances; but unless the liquid is notably rich in nitrogenous substances the process of evaporation, on account of the cost of fuel, is so expensive as to practically prohibit the extraction of nitrogenous substances by this means. Moreover, these refuse liquids, and likewise the nitrogenous substances after evaporation of the water, are accompanied by more or less of hygroscopic salts—such, for example, as the chlorides of sodium, calcium, and magnesium. These salts absorbing moisture from the atmosphere cause the products of evaporation to be persistently wet or moist; but fertilizers in order to be economically distributable on any considerable scale by machinery at present in use should be dry, and therefore substantially free from such hygroscopic salts. I have discovered a process by which the nitrogenous substances contained in factory refuse liquids may be secured, and this whether the liquids contain much or little of said substances, and by which process the hygroscopic salts are substantially eliminated and a new nitrogenous product obtained which is substantially dry and which remains dry under ordinary atmospheric conditions and is in all respects suitable to be used as a fertilizer, as well as for other purposes.

My process consists in mixing the waste sulphite liquor of the cellulose industry, sometimes called "sulphite lye," with the refuse liquids of such industries as contain nitrogenous substances, then filtering the mixture, and preferably drying the resulting product. The effect of mixing the sulphite liquor with such refuse liquids is to precipitate the nitrogenous substances. The cost of transporting the sulphite liquor to the place where the refuse liquids are found might often be great; but substantially the same effect of precipitating may be secured by first more or less evaporating the sulphite liquor and mixing the residue, preferably with the addition of water, with the nitrogenous refuse liquids. This greater or less evaporation of the sulphite liquor as it comes from the factory, whether with or without the subsequent addition of water, does not substantially affect its capacity to act as the precipitating agent of this invention. It is in any of these forms substantially the same thing and is still to be regarded as the sulphite liquor of the cellulose industry. I use the expression "sulphite residue" in this specification and claims as a generic term for sulphite liquor and sulphite liquor after evaporation, whether more or less evaporated and whether water be subsequently added or not. By the filtration above mentioned the water, and with it the hygroscopic salts, is substantially eliminated, and by subsequent drying the nitrogenous substances are promptly brought to a dry and more or less pulverulent condition, fitting them to be used under all circumstances as agricultural fertilizers, although they could be less conveniently and less universally used without being dried.

The amount of sulphite residue to be added to the nitrogenous refuse liquid will vary according as the refuse liquid is more or less rich in nitrogenous substances. The richer the liquid the more sulphite residue is required. To obtain the most complete result, the sulphite residue should be added so long as precipitation continues, which is readily observable. As an example, however, it may be stated that with a liquid containing three per cent. of nitrogenous substances one part of sulphite liquor as it comes from the factory, or the residue thereof, to five parts of nitrogenous refuse liquid will be successful; but I do not limit myself to this ratio. The filtering process is conducted more readily and successfully after complete precipitation than if precipitation be not complete. The precipitation, moreover, may sometimes be hastened by more or less heating of the nitrogenous refuse liquids. For this purpose a temperature of, for example, 180° Fahrenheit will be found efficient. In most cases, and especially when decomposition of the nitrogenous liquors has advanced to any considerable extent, precipitation will be facilitated by adding to them, in combination with the sulphite residue or separately, but without intervening filtration, a small amount of acid, such as sulphuric or muriatic acid, or soluble salts, such as sulphate of soda or sulphate of aluminum in the proportion, for example, of one part of acid to, say, one hundred parts of the nitrogenous liquids. This, however, is not so necessary when the nitrogenous liquids are fresh. Any of the well-known means of filtering—for example, the ordinary filter-presses—may be employed. Indeed, after precipitation a large part of the water and of the salts held in solution in the water may be run off from the top and the balance filtered.

Among the nitrogenous refuse liquids that may be treated as above set forth are those resulting from the menhaden industry, the starch industry, and the slaughter-house industry. Inasmuch as these and other such liquids, as well as the sulphite liquor, have been heretofore to a large extent not only thrown away, but have been objectionable in many ways, the invention is seen to be one of importance aside from its commercial value.

The product resulting from the above-described process is not specifically claimed in this application, but is reserved for and forms the subject-matter of a separate application filed by me in the United States Patent Office on the 29th day of September, 1899, Serial No. 732,038.

What I claim as new, and desire to secure by Letters Patent, is—

1. The process of extracting nitrogenous substances from nitrogenous refuse liquids which consists in mixing with such refuse liquids, sulphite residue of the cellulose industry, thereby precipitating the nitrogenous substances and then filtering the resulting product, substantially as described.

2. The process of extracting nitrogenous substances from nitrogenous refuse liquids which consists in mixing with such refuse liquids, sulphite residue of the cellulose industry, thereby precipitating the nitrogenous substances, then filtering and afterward drying the resulting product, substantially as described.

3. The process of extracting nitrogenous substances from nitrogenous refuse liquids which consists in precipitating the said substances from the nitrogenous liquids by adding to said liquids sulphite residue of the cellulose industry, and then filtering the resulting product, maintaining the said nitrogenous refuse liquids in a heated condition during the process of precipitation, substantially as described.

4. The process of extracting nitrogenous substances from nitrogenous refuse liquids which consists in precipitating the said substances from the nitrogenous liquids by adding to said liquids sulphite residue of the cellulose industry, and then filtering and drying the resulting product, maintaining the said nitrogenous refuse liquids in a heated condition during the process of precipitation, substantially as described.

5. The process of extracting nitrogenous substances from nitrogenous refuse liquids, which consists in evaporating the water more or less completely from the sulphite liquor of the cellulose industry, then mixing the remainder with the nitrogenous refuse liquids, thus precipitating the nitrogenous substances, then filtering and drying the resulting product, substantially as described.

6. The process of extracting nitrogenous substances from nitrogenous refuse liquids, which consists in evaporating the water more or less completely from the sulphite liquor of the cellulose industry, then mixing the remainder, with the addition of water, with the nitrogenous liquids, thus precipitating the nitrogenous substances, then filtering and drying the resulting product, substantially as described.

7. The process of extracting nitrogenous substances from nitrogenous refuse liquids, which consists in evaporating the water more or less completely from the sulphite liquor of the cellulose industry, then mixing the remainder with the nitrogenous refuse liquids, thus precipitating the nitrogenous substances, then filtering and drying the resulting product, maintaining the said nitrogenous refuse liquids in a heated condition during the process of precipitation, substantially as described.

8. The process of extracting nitrogenous substances from nitrogenous refuse liquids, which consists in evaporating the water more or less completely from the sulphite liquor of the cellulose industry, then mixing the remainder, with the addition of water, with the nitrogenous refuse liquids, thus precipitating the nitrogenous substances, then filtering and drying the resulting product, maintaining the said nitrogenous refuse liquids in a heated condition during the process of precipitation, substantially as described.

In testimony whereof I have signed my name to this specification in the presence of two subscribing witnesses.

LUDWIG RISSMULLER.

Witnesses:
EDWIN SEGER,
GEO. W. MILLS, Jr.